(12) United States Patent
Blair et al.

(10) Patent No.: US 6,733,891 B1
(45) Date of Patent: May 11, 2004

(54) ROLL HAVING GLASS COATING

(75) Inventors: Christopher D. Blair, Ontario, NY (US); Timothy R. Jaskowiak, Webster, NY (US)

(73) Assignee: Xerox Corporation, Stamford, CT (US)

( * ) Notice: Subject to any disclaimer, the term of this patent is extended or adjusted under 35 U.S.C. 154(b) by 224 days.

(21) Appl. No.: 09/584,373

(22) Filed: May 31, 2000

(51) Int. Cl.[7] .......................... B32B 17/06; B05D 1/00; C03C 8/00
(52) U.S. Cl. ..................... 428/432; 428/375; 428/469; 428/697; 501/14; 501/18; 501/19; 501/24; 501/54; 501/55; 501/63; 501/68; 501/73; 427/452; 427/430.1; 427/421; 427/427; 355/47; 355/104; 355/110; 355/117; 399/286; 399/279; 399/276; 492/53; 29/895.32
(58) Field of Search ................... 399/276, 279, 399/286; 501/11, 14, 17, 19, 24, 54, 55, 63, 68, 73; 492/48, 49, 53, 54; 355/47, 104, 110, 117; 106/608, 612; 428/379, 375, 389, 392

(56) References Cited

U.S. PATENT DOCUMENTS

| | | | | |
|---|---|---|---|---|
| 3,884,550 A | * | 5/1975 | Maurer et al. | 385/142 |
| 4,057,666 A | * | 11/1977 | Drummond, Jr. | 428/34.1 |
| 5,237,747 A | * | 8/1993 | Nakashima | 29/895.32 |
| 5,697,029 A | * | 12/1997 | Saitoh et al. | 399/286 |
| 5,805,964 A | * | 9/1998 | Badesha et al. | 399/266 |
| 6,254,976 B1 | * | 7/2001 | Ono | 428/304.4 |
| 6,320,387 B1 | * | 11/2001 | Abramsohn et al. | 324/452 |
| 6,327,452 B1 | * | 12/2001 | Jaskowiak et al. | 399/286 |

* cited by examiner

Primary Examiner—Deborah Jones
Assistant Examiner—G. Blackwell-Rudasill
(74) Attorney, Agent, or Firm—Oliff & Berridge, PLC

(57) ABSTRACT

Rolls include a core and a glass outer coating on the core. The glass can be electrically charged and discharged. The outer coatings have smooth finishes and controlled electrical properties. The outer coatings can also provide selected mechanical, chemical and thermal properties. The rolls can be used in various applications in which controlled electrical properties are desired. For example, the rolls can be used as charge donor rolls in electrostatographic imaging apparatus.

32 Claims, 3 Drawing Sheets

ROLL HAVING GLASS COATING

BACKGROUND OF THE INVENTION

1. Field of Invention

This invention relates to rolls, such as for use in electrostatographic imaging devices.

2. Description of Related Art

Electrostatic reproduction involves uniformly charging a photoconductive member, or photoreceptor, and imagewise discharging it, or imagewise exposing it, based on light reflected from an original image being reproduced. The result is an electrostatically-formed latent image on the photoconductive member. The latent image is developed by bringing a charged developer material into contact with the photoconductive member.

Two-component and single-component developer materials are known. Two-component developer materials comprise magnetic carrier particles and charged toner particles that adhere triboelectrically to the carrier particles and are intended to adhere the photoconductive member.

A single-component developer material typically consists of only toner particles. The toner particles typically have an electrostatic charge to adhere to the photoconductive member, and magnetic properties to magnetically convey the toner particles from the sump to the magnetic roll. The toner particles adhere directly to the donor roll by electrostatic charges. The toner particles are attracted to the donor roll from a magnet or developer roll. From the donor roll, the toner is transferred to the photoconductive member in the development zone.

For both types of developer material, the charged toner particles are brought into contact with the latent image to form a toner image on the photoconductive member. The toner image is transferred to a receiver sheet, which passes through a fuser device where the toner particles are heated and permanently fused to the sheet, forming a hard copy of the original image.

A development device is used to bring the charged toner particles into contact with the latent image formed on the photoreceptor, so that the toner particles adhere electrostatically to the charged areas on the latent image. The development device typically includes a chamber in which the developer material is mixed and charged.

One type of two-component development method and apparatus is known as "scavengeless development." In scavengeless development systems, toner is detached from the donor roll by applying an alternating current (AC) electric field to electrodes disposed between the donor roll and the photoconductive member. There is no physical contact between the development apparatus and the photoconductive member. Scavengeless development is useful in apparatus in which different types of toner are supplied to the same photoconductive member.

"Hybrid" scavengeless development apparatus typically includes a mixing chamber that holds a two-component developer material, a developer material developer or magnetic roll, a donor roll, a development zone, and an electrode structure at the development zone between the donor roll and the photoconductive member. The donor roll receives charged toner particles from the developer roll and transports the particles to the development zone. An AC voltage is applied to the electrodes to form a toner cloud in the development zone. Electrostatic fields generated by an adjacent latent image on the photoconductive member surface attract charged toner particles from the toner cloud to develop the latent image on the photoconductive member.

Another variation on scavengeless development uses single-component developer material development systems. As in two-component developer material development systems, the donor roll and electrodes also create a toner cloud.

SUMMARY OF THE INVENTION

In both one-component and two-component developer scavengeless development systems, the electrical, chemical and physical characteristics of the donor roll affect the ability of the development apparatus to effectively transport toner particles into the development zone and to achieve high-quality image development. The donor roll should have characteristics that enable charged toner particles to effectively and controllably adhere electrostatically to the donor roll's outer surface, and be donated to the photoconductive member. It is desirable that the electrical properties of the donor roll be uniform and also tunable. It is also desirable that the donor roll be able to withstand wear and harmful chemicals.

The donor roll outer surface should also have sufficient mechanical properties, including wear resistance, to withstand wear and other types of degradation during service.

It is also desirable that the outer surface of the donor roll have a smooth finish (low roughness).

It is also desirable that the outer surface of the donor roll have good machining characteristics so that a desired surface finish can be formed.

It is also desirable that the outer surface of the donor roll comprises a material that is chemically resistant to withstand exposure to certain chemicals.

It is further also desirable that the outer surface of the donor roll comprises a material that has sufficient thermal properties.

It is still further desirable that the outer surface of the donor roll not be difficult to form and process.

This invention provides rolls, such as donor rolls, that comprise a glass coating that enables charged toner to effectively and controllably adhere electrostatically to the roll, and to be effectively donated to a photoconductive member to form an images.

This invention separately provides rolls having coatings that can be formed using conventional coating techniques.

This invention separately provides rolls having coatings with more uniform, and tunable, electrical properties.

This invention separately provides rolls having coatings with controlled mechanical properties.

This invention separately provides rolls having coatings with high hardness and wear resistance.

This invention separately provides rolls having an outer surface with a smooth finish.

This invention separately provides methods of making such rolls.

Exemplary embodiments of the rolls according to this invention comprise a core and a coating formed over the core. The coating comprises a glass material. Exemplary embodiments of the coating can also provide desired electrical, mechanical, chemical and/or thermal properties.

The properties of the coating make the rolls suitable for use in an electrostatographic imaging apparatus, such as for use in hybrid scavengeless development.

The coatings of the rolls can be applied onto substrates such as cores using conventional coating techniques.

Further, the coatings can be processed using conventional finishing techniques.

Exemplary embodiments of the methods of forming the rolls according to this invention comprise applying a glass coating over a core. The coating can be applied over the core by any suitable glass coating process.

BRIEF DESCRIPTION OF THE DRAWINGS

Preferred embodiments of this invention will be described in detail, with reference to the following figures, in which.

DETAILED DESCRIPTION OF PREFERRED EMBODIMENTS

Figure 1:
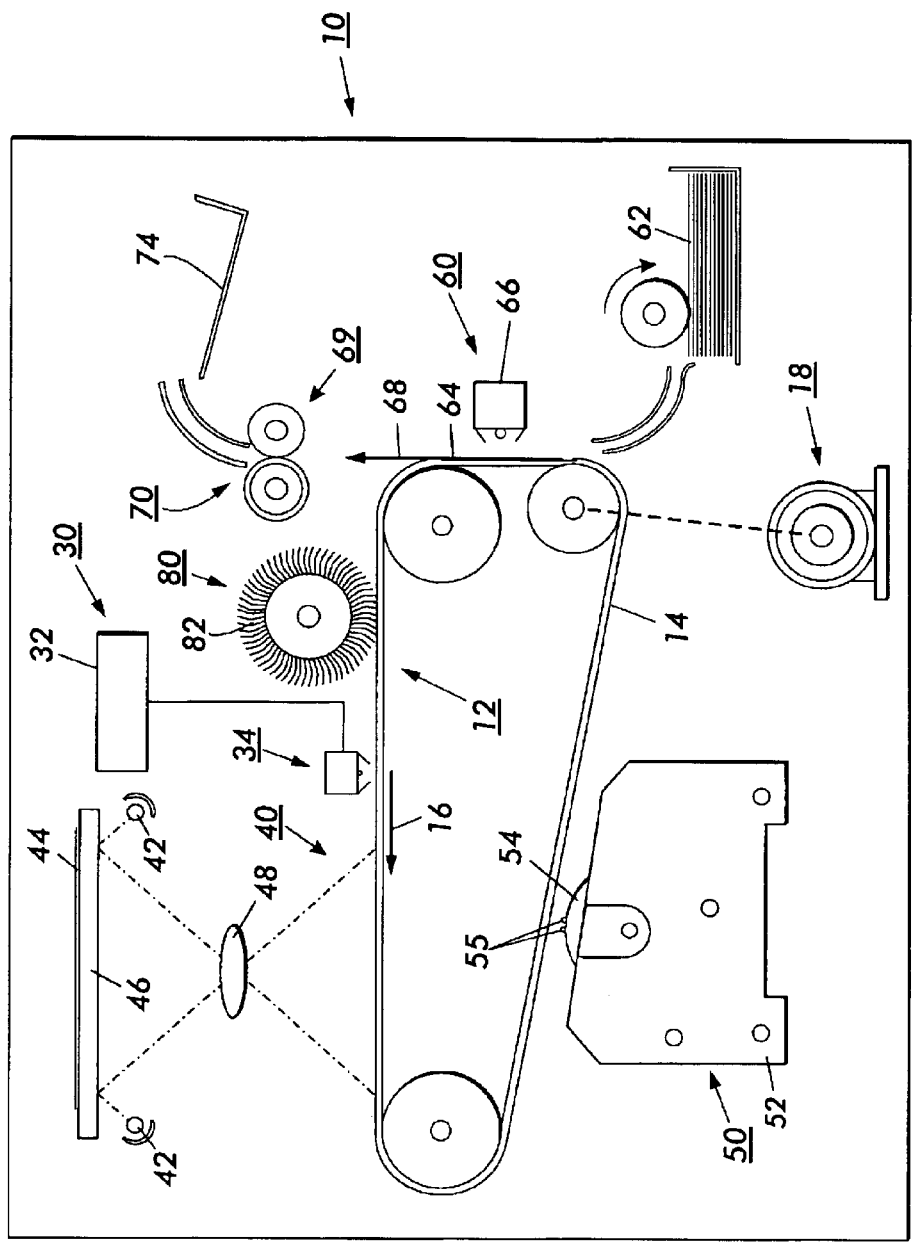
FIG. 1 illustrates a scavengeless electrostatographic development apparatus including an exemplary embodiment of a donor roll according to this invention.

FIG. 1 shows a scavengeless electrostatic imaging apparatus 10 including an exemplary embodiment of a donor roll 54 according to this invention. The imaging apparatus 10 includes an image bearing member in the form of a belt 12 having an outer photoconductive surface 14. The image bearing member can alternatively comprise other types of photoconductive image bearing members, such as a drum having a photoconductive surface. The belt 12 moves in the direction of the arrow 16 to advance successive portions of the photoconductive surface 14 sequentially through various processing stations during the imaging process. The belt 12 is driven by a motor 18.

Initially, a portion of the belt 12 passes through a charging station 30 where a power supply 32 causes the corona generating device 34 to charge a portion of the photoconductive surface 14 of the belt 12.

The charged portion of the belt 12 is advanced to a exposure station 40. At the exposure station 40, one or more light sources such as lamps 42 emit light that is reflected onto an original document 44 seated on a transparent platen 46. The light reflected imagewise from the original image of the document 44 is transmitted through a lens 48. The lens 48 focuses the imagewise light onto the charged portion of the photoconductive surface 14 to selectively dissipate the charge to form a latent image. The latent image formed on the photoconductive surface 14 corresponds to the informational areas contained within the original image of the document 44. For such s imagewise exposure of the photoconductive surface 14 in a digital copier, a laser printer and the like, a raster output scanner (ROS) can alternatively be used instead of the lamps 42 and lens 48.

After the electrostatic latent image is formed on the photoconductive surface 14, the belt 12 advances the latent image to a development station 50. At the development station 50, a development apparatus 52 develops the latent image recorded on the photoconductive surface 14 to form a toner image.

The belt 12 then advances the toner image to a transfer station 60 where a copy sheet 62 is advanced by a sheet feeding apparatus 64 to transfer the toner image to the sheet 62. The transfer station 60 also includes a corona generating device 66, which sprays ions onto the sheet 62 to attract the toner image from the photoconductive surface 14 onto the sheet 62. After this image transfer, the sheet 62 is separated from the belt 12 and moved in the direction of the arrow 68 by rollers 69 to a fusing station 70.

The fusing station 70 includes a fuser assembly that heats, fuses and permanently affixes the toner image to the sheet 62, forming a sheet copy of the original image of document 44. The sheet 62 is then advanced to a tray 74.

The belt 12 moves the portion of the surface 14 from which the image had been transferred to the sheet 62 to a cleaning station 80. The cleaning station 80 can include a brush 82 or the like that rotates in contact with the photoconductive surface 14 to remove the residual toner particles. Next, light is emitted onto the photoconductive surface 14 to dissipate any residual electrostatic charge on the belt 12.

Figure 2:
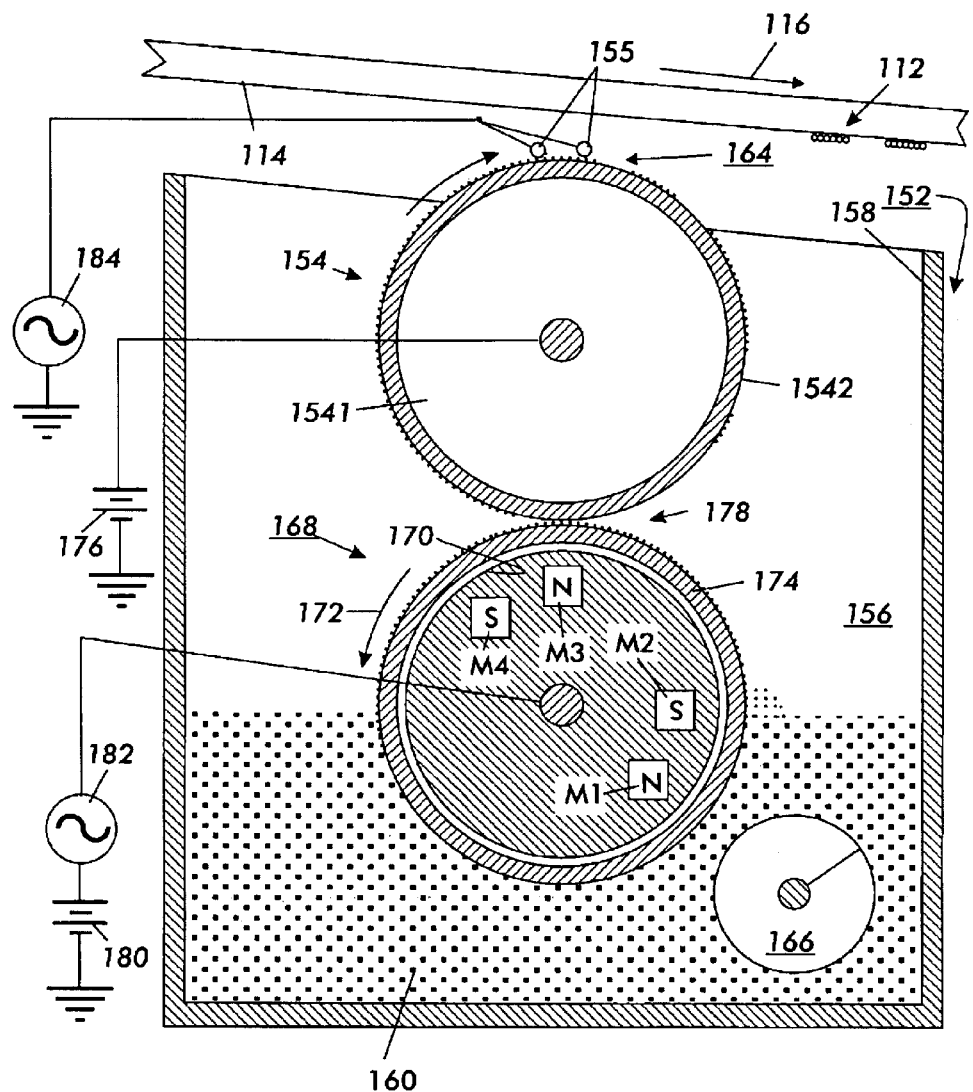
FIG. 2 illustrates a two-component, hybrid scavengeless development device including an exemplary embodiment of a donor roll according to this invention.

FIG. 2 shows a hybrid scavengeless two-component development apparatus 152 including an exemplary embodiment of a donor roll 154 according to this invention. The donor roll 154 is mounted partially within a mixing chamber 156 defined by a housing 158. The mixing chamber 156 holds a supply of a two-component developer material 160 comprising toner particles and carrier beads. The donor roll 154 transports toner particles that have been fed from the mixing chamber 156 into contact with electrode wires 155 within a development zone 164 for latent image development. The developer material 160 is moved and mixed within the mixing chamber 156 by a mixing device 166 to charge the carrier beads and toner particles. The oppositely charged toner particles adhere triboelectrically to the charged magnetizable carrier beads.

The development apparatus 152 also includes a developer material feeder assembly, such as a magnetic roll 168, that feeds a quantity of the developer material 160 from the mixing chamber 156 to the donor roll 154. The magnetic roll 168 includes a substrate 170. The substrate 170 rotates in the direction of the arrow 172, and includes a coating 174, and magnetic members M1 to M4. The magnetic roll 168 and the donor roll 154 are electrically biased relative to each other so that charged toner particles of the developer material 160 fed to the donor roll 154 are attracted from the magnetic roll 168 to the donor roll 154.

In some other embodiments, the coating 174 is not needed on the substrate 170 to provide the desired transport properties. In addition, the substrate 170 can include a different number of magnetic members than the four magnetic members M1 to M4 in FIG. 2.

As also shown in FIG. 2, the donor roll 154 is biased to a specific voltage by a direct current (DC) power supply 176 so that the donor roll 154 attracts charged toner particles from the magnetic roll 168 in a nip 178. To enhance the attraction of charged toner particles from the mixing chamber 156, the magnetic roll 168 is also biased by a DC voltage source 180. The magnetic roll 168 is also biased by an AC voltage source 182 that temporarily loosens the charged toner particles from the magnetized carrier beads. The loosened charged toner particles are attracted to the donor roll 154. An AC bias is also applied to the electrode wires 155 by an AC voltage source 184 to loosen charged toner particles from the donor roll 154, and to form a toner cloud within the development zone 164.

Other embodiments of the hybrid scavengeless two-component development apparatus 152 can comprise more than one donor roll 154, such as, for example, two donor rolls 154. Such apparatus can also include more than one magnetic roll 168 and more than one mixing device 166.

The donor roll 154 can also be used in scavengeless single-component development apparatus.

The donor roll 154 is an example of one type of roll encompassed by this invention. As described below, the rolls according to this invention can be used in other types of rolls as well.

Figure 3:
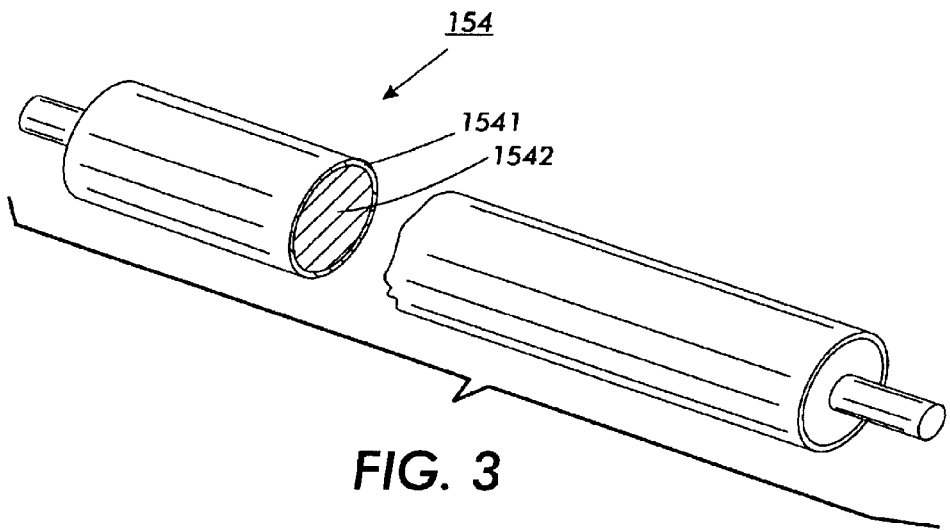
FIG. 3 illustrates an exemplary embodiment of a donor roll according to this invention including a glass coating.

As shown in FIG. 3, exemplary embodiments of the donor rolls 154 according to this invention include a core 1541 and a coating 1542 formed over the core 1541. The coating 1542 is typically formed directly over the core 1541. The coating 1542 typically also defines the outer surface of the donor roll 154.

However, embodiments of the donor roll 154 can include one or more layers between the core 1541 and the coating 1542. For example, a metal layer may be formed over the core 1541 and the coating 1542 formed over the metal layer. Other suitable layers can also be formed between the core 1541 and coating 1542.

In addition, embodiments of the donor roll 154 can comprise a suitable surface coating applied over the coating 1542. Such optional coatings are described, for example, in U.S. patent application No. 09/503,936 filed on Feb. 14, 2000 and incorporated herein by reference in its entirety.

The core 1541 can comprise any suitable material that has desired electrical conducting properties. In embodiments, the material forming the core 1541 should preferably be able to withstand the temperatures that are typically reached during the process of coating the core 1541, as described in detail below.

The core 1541 can be formed, for example, of any suitable metallic materials, non-metallic materials, or combinations thereof. Ferrous materials such as plain carbon steels and stainless steels can be used to form the core 1541. In addition, non-ferrous materials such as aluminum and aluminum alloys, and copper-based materials such as brass, can be used to form the core 1541. These non-ferrous materials have a higher coefficient of thermal expansion than steels.

Further, non-metallic materials such as glass, composites and ceramics can be used to form the core 1541. For the non-metallic core materials, the core 1541 and coating 1542 are electrically grounded.

In exemplary embodiments, the core 1541 can be formed of one of the above-described non-metallic materials and one or more metal layers can be formed on the non-metallic core to provide a suitable surface for applying the coating 1542. For example, a ceramic core 1541 can be coated with any suitable metal such as, for example, aluminum, and the coating 1542 can be applied over the metal coating.

In embodiments, it is contemplated that suitable glasses having relatively low coefficients of thermal expansion could be applied over cores formed of materials that have relatively low coefficients of thermal expansion, such as ceramics and low carbon steels.

The core 1541 is typically cylindrical shaped. However, other suitable shapes can be used, as desired. For example, it is contemplated that the glass coatings 1542 could be applied on endless belts, such as photoreceptor belts. In such embodiments, the glass coatings 1542 could be very thin, e.g., of a submicron thickness, so that the glass coatings 1542 are pliable like the endless belt.

According to this invention, the coating 1542 formed on the core 1541 is composed of a glass material. In certain exemplary embodiments of the donor roll 154 according to this invention, the coating 1542 can consist essentially of glass. In other exemplary embodiments of the donor roll, the coating 1542 can comprise one or more additives to control selected ones of the electrical, mechanical, thermal and chemical properties of the coating 1542.

The composition of the glass material of the coating 1542 is selected to provide the desired properties to the coating 1542. One consideration in selecting the glass material composition is the desired thermal properties of the outer coating 1542. In embodiments of the donor roll 154, the coating 1542 can have a coefficient of thermal expansion that closely matches the coefficient of thermal expansion of the substrate on which the coating 1542 is formed. For example, the respective coating 1542 and core 1541 compositions can be selected such that their respective coefficients of thermal expansion differ by less than about 1 ppm/° C. Preferably, the coefficients of thermal expansion of the coating 1542 and core 1541 differ by as small of a value as possible. By closely matching the coefficients of thermal expansion of the core 1541 and coating 1542, a good seal can be formed between the coating 1542 and the core 1541. It is also desirable that the glass material formed on the core 1541 have resistance to thermal induced degradation, and to failure caused by repeated thermal cycling of the coating 1542 during normal operation of the donor roll 154.

Another consideration in selecting the composition of the glass material is that it have the desired electrical properties to enable the coating 1542 to be sufficiently electrically charged and discharged to provide improved performance.

It is also desirable that the coating 1542 have uniform electrical properties throughout its volume so that it can be uniformly electrically charged and discharged.

Another consideration in selecting the composition of the glass material of the coating 1542 is that the glass material have the desired mechanical properties for use in the donor roll 154. These mechanical properties typically include suitable hardness, wear resistance against abrasion, strength and ductility.

Another consideration in selecting the composition of the glass material of the coating 1542 is that the glass material have the desired chemical resistance. Generally, the glass coatings 1542 are highly chemical resistant. When used in electrostatographic imaging apparatus, the glass coatings 1542 are preferably resistant to toner, paper fibers and other substances commonly found in these environments.

A suitable exemplary material for forming the coatings 1542 in view of the above-described considerations is sodium silicate glass. Sodium silicate glass provides desirable properties. In addition, these glasses are inexpensive and easier to process than some other types of glass such as germenate, borate and phosphate glasses. Sodium is included in sodium silicate glass to modify its electrical properties. Generally, the conductivity of sodium silicate glass increases as a function of increasing soda concentration. However, the amount of soda in the sodium silicate glass material is controlled to prevent phase separation, which would result in sodium droplets in a silica matrix. Such phase separation can occur if the soda concentration is decreased to below about 7 mol % of soda.

The coefficient of thermal expansion of sodium silicate glass increases slightly as a function of soda concentration. The melting point of sodium silicate glass decreases significantly with an increase of the soda content.

According to this invention, other glasses can be used in addition to sodium silicate glass to form the coating 1542. For example, germenate and borate glasses do not undergo phase separation with increasing soda concentration. Phosphate glasses have higher coefficients of thermal expansion and thermal conductivity than sodium silicate glass or any other type of glass. These glasses, as well as lithium glasses, can also be used in exemplary embodiments of the coating 1542.

As stated above, additives can be included in the glass materials forming the coating 1542 in order to tune its properties, including one or more of its electrical, mechanical, thermal and chemical properties. For example, metals, generally in the form of metal oxides, can be added to the glass material to tailor its coefficient of thermal expansion and electrical conductivity. The metals can also be added to vary the color of the glass. Exemplary metal oxides that can be included in the glass material include, but are not limited to, oxides of Na, Al, Si, P, K, Ti, V, Cr, Fe and Ni. In addition, one or more elements such as Ni, Ag, Au, Li, Rb, Cs, Mg, Ca, Sr, Ba, Y, Sc, Mn, Co, Cu, Pb and Bi can be added to the glass material.

The conductivity of the glass material forming the coating 1542 can be tuned by including one or more of the metal oxides in selected amounts. Soda, $Na_2O$, is effective because it has a relatively small size and good mobility within the glass to material. However, soda also raises the coefficient of thermal expansion and decreases the durability and hardness of the glass material. Other substances can be added to compensate for the effect of soda and enhance the durability of the glass material. For example, aluminum oxide or calcium oxide (lime) can be added to the melt to increase durability. However, these additives can decrease both the conductivity and thermal expansion of the glass material. Accordingly, the one or more additives that can be included in the glass material can be selected based on their individual effects so as to achieve the overall desired properties of the glass material. The overall desired properties of the glass material are typically based on the properties of the core 1541 on which the glass material is formed and the intended application of the roll 154.

For example, aluminum cores 1541 have a high coefficient of thermal expansion. Accordingly, the glass materials formed on aluminum cores 1541 should also have a high coefficient of thermal expansion in order to closely match that of the aluminum core 1541, so that a good seal can be formed between the core 1541 and the coating 1542.

As stated above, coatings 1542 can also be formed on cores 1541 that have lower coefficients of thermal expansion than aluminum and other like metals. For example, such cores can comprise steels. The composition of the glass material can be selected so that the coating 1542 forms a good seal on the core 1541 composed of such metals.

The glass material forming the coating 1542 can also provide the desired electrical properties. The glass materials have amorphous structures. Consequently, the electrical properties of the glass material can be more closely controlled than for crystalline materials having grain boundaries, including ceramic materials. The glass materials can provide improved control of the electrical properties throughout the coatings, i.e., improved uniformity of the electrical properties.

The glass material forming the coating 1542 can provide the desired mechanical properties. Desired mechanical properties of the coating 1542 include a suitably high hardness, wear resistance and toughness. The glass coatings 1542 typically have a Knoop hardness number of at least about 4 GPa (4 GPa Knoop).

The surface smoothness of the coating 1542 can be quantitatively characterized by known surface roughness measurement and characterization equipment and techniques. In embodiments of the coating 1542, the surface of the coating 1542 can have a maximum waviness Wt of less than about 1 $\mu$m and a surface smoothness or arithmetical mean roughness Ra of less than about 0.75 $\mu$m after completion of all finishing operations on the coating 1542. In other embodiments of the coating 1542, the surface of the coating 1542 can be even smoother and can have a maximum waviness Wt of less than about 0.1 $\mu$m, and a surface smoothness or arithmetical mean roughness Ra of less than about 0.1 $\mu$m, after all finishing operations have been performed on the coating 1542.

In addition, the glass material of the coating 1542 can be easily prepared to the desired surface finish characteristics. The glass materials can be machined, such as by conventional grinding processes, to a smooth, i.e., low roughness, finish.

In addition, the smooth surface finishes provided by glass coatings 1542 reduce machining cycle times. First, glass materials have a smoother surface in the as-deposited state than some known ceramic materials formed by processes such as plasma spraying. In addition, the machining cycle time for the coatings 1542 can be significantly lower than that required for some known ceramic coatings, such as alumina coatings. This high cycle time for such ceramic coatings is necessitated by the slow traverse speed and small depth of cut that must be used in grinding them, due to their multi-grained structures and relatively high hardness.

The glass material forming the coating 1542 can provide the desired thermal properties. The glass material forming the coating 1542 can also provide the desired thermal expansion properties. The thermal expansion coefficient of the coating 1542 is important to enable a satisfactory bonding of the coating 1542 onto a substrate. As described below, the substrate has a metal surface on which the coating 1542 is applied. The thermal expansion coefficient of the coating 1542 is selected to match as closely as possible the thermal expansion coefficient of the metal surface. By closely matching the thermal expansion coefficients, a good glass-to-metal bond can be achieved.

The glass material forming the coating 1542 can also provide the desired chemical resistance properties. The glass materials need to be able to withstand exposure to chemicals including liquids, solids and gases that are typically present in the environments in which the rolls are used. For example, in electrostatographic imaging device, chemicals that are typically found and that are harmful to some materials include, for example, toner, paper fibers, developer fluid and fuser oil. The glass materials forming the coatings 1542 can provide good resistance to these and other chemicals, and thus prolong the service life of the rolls 154.

As stated above, the composition of the coating 1542 can be selected to provide the desired properties to the donor roll 154. Regarding the electrical properties, the electrical resistivity of the coating 1542 can be from about $1\times10^4 \Omega \cdot cm$ to about $1\times10^{14} \Omega \cdot cm$. In some embodiments, the electrical resistivity of the coating 1542 is preferably from about $1\times10^4 \Omega \cdot cm$ to about $1\times10^6 \Omega \cdot cm$.

The time constant (i.e, capacitance×resistivity) of the coating 1542 is dependent on the coating thickness, as both the electrical resistivity and capacitance include a length dependant term. Accordingly, in electrostatographic imaging applications, the final coating thickness can be selectively varied to provide a roll that is well suited for given machine requirements. In addition, the revolution speed of the roll can also be changed to accommodate different coating resistivities, which ultimately effects the machine printing rate.

Suitable glass materials for forming the coating 1542 are commercially available from Ferro, Inc., Coatings and Color Division, located in Cleveland, Ohio. The glass materials are typically provided in slurry or powder form. For slurries of the glass materials, the slurries preferably comprise particles having a size of less than about 100 µm. Machining, such as by ball milling or the like, can be used to achieve smaller particle sizes, if desired.

An exemplary sodium silicate glass composition and exemplary ranges of the amounts of the components of the glass material are as follows: silica ($SiO_2$), from about 40 mol % to about 95 mol %; soda ($Na_2O$), from about 5 mol % to about 60 mol %; alumina ($Al_2O_3$), from 0 to about 7 mol %; phosphate ($P_2O_5$), from 0 to about 5 mol %; potash ($K_2O$), from 0 to about 10 mol %; titania ($TiO_2$), from 0 to about 20 mol %; vanadium penta-oxide ($V_2O_5$), from 0 to about 10 mol %; chromia ($Cr_2O_3$), from 0 to about 8 mol %; iron oxide ($Fe_2O_3$), from 0 to about 5 mol %; nickel, from 0 to about 5 mol %; silver, from 0 to about 5 mol %; and gold, from 0 to about 5 mol %.

That is, silica and soda are the only components in the above group of components that are required in every sodium silicate glass composition according to exemplary embodiments of this invention. The remaining components in the above group (i.e., alumina, phosphate, potash, titania, vanadium penta-oxide, chromia, iron oxide, Ni, Ag and Au) can be selectively added in the above molar percentages, or not included, in various exemplary embodiments, depending the desired properties of the coating 1542 formed from the glass material.

The above-described group of components of the soda silicate glass can provide an electrical resistivity of from about $1\times10^5 \Omega\cdot cm$ to about $1\times10^{14} \Omega\cdot cm$, and a time constant of from about $1.5\times10^{-7}$ seconds for a coating thickness of about 25 µm at $1\times10^5 \Omega\cdot cm$, to about $3\times10^2$ seconds for a coating thickness of 200 µm at $1\times10^{14} \Omega\cdot cm$. The lower electrical resistivity of $1\times10^5 \Omega\cdot cm$ is a theoretical value based on an approximate 50 mol % $Na_2O$–50 mol % $SiO_2$ glass composition. This particular glass would have a lower coefficient of thermal expansion and would be suitable for coating cores having a similar low coefficient.

An exemplary suitable glass material composition that can be applied on aluminum cores 1541 to form the outer coating 1542 is QP732, manufactured by Ferro Inc. This particular material comprises oxides of Na, Al, Si, P, K, Ti, V, Cr, Fe and Ni suspended in water. QP 732 has a very high coefficient of thermal expansion of about 23 ppm/K for a glass material, making it suitable for forming an outer coating 1542 on cores 1541 formed of aluminum and like materials.

The coating 1542 can be applied onto the core 1541 by any suitable coating process. Suitable processes for forming the coatings include, for example, electrostatic spraying, wet coating, dip coating, plasma spraying and vacuum deposition. For electrostatic spraying processes, the glass material is applied onto the core by electrostatic spray while the core 1541 is electrically grounded and typically rotated to promote uniform coverage of the glass material on the core 1541. Electrostatic spraying process parameters include the electrostatic spray feed rate, the core rotation rate, the spray device traverse speed relative to the core 1541, and the number of spray passes. These process parameters can be selected to control the coating uniformity and thickness of the coating 1542.

For wet spraying techniques, the glass material can be formed into a slurry and applied by any suitable wet spraying technique. The resulting coating 1542 is typically adhered onto the core 1541 at an elevated temperature. For example, the elevated temperature can be from about 480° C. to about 900° C.

For melt flow coating techniques, the glass material can be formed as a melt and then applied onto the core 1541 to form the coating 1542.

The coating 1542 can be applied to cover substantially the entire outer surface of the core 1541. In some embodiments, however, it may be desirable to coat most of the outer surface of the core 1541, but to leave selected uncoated regions on the outer surface of the core 1541, such as near the ends of the roll 154. The ends or faces of the core 1541 are typically also coated.

The coating 1542 is applied onto the core 1541 after a suitable surface finish has been formed on the core 1541. Typically, the core 1541 outer surface is prepared, such as by grit blasting, to provide a suitable surface for applying the coating 1542 onto the core 1541. The roughness level of the surface of the core 1541 is typically suitable to achieve sufficient mechanical interlocking with the coating 1542 to provide good adhesion.

Also, prior to preparing the core 1541 outer surface for application of the coating, the core 1541 is typically heated to stress relieve the core 1541. This heating process is referred to as heat soaking. In embodiments, the core 1541 is heated to a temperature of from about 550° C. to about 900° C. and maintained at this temperature for a sufficient amount of time to stress relieve the core 1541. The stress relief process enables the core 1541 to be more effectively ground to round, i.e., to a cylindrical shape having a uniform diameter along the donor roll 154. In addition, the stress relief enhances the roundness and dimensional tolerance of the as-coated donor roll 154.

After the glass material has been applied on the core 1541 to form the coating 1542, the coating 1542 is heated to a temperature range, and held at this temperature for an amount of time, that are effective to cure the glass material. Typically, the glass material can be cured by maintaining the outer coating 1542 at a temperature of from about 900° F. to about 1600° F. for a period of from about 4 minutes to about 10 minutes. The curing cycle time can be adjusted to compensate for the mass of the core 1541.

For example, the exemplary soda silicate glass composition described above that does not contain Ag or Au, can typically be cured at a temperature of about 1040° F. in about 10 minutes. When this composition is formed as an outer coating 1542 on the core 1541, the curing time is typically about 1 hour.

The thickness of the coating 1542 as formed on the core 1541 by the coating process is typically from about 100 µm to about 300 µm.

An unfinished donor roll typically has an arithmetic mean roughness Ra of from about 1 µm to about 2 µm. This surface smoothness level may not be completely satisfactory for some high-precision electrostatographic development applications. Accordingly, in some exemplary embodiments of the coating 1542, the coating 1542 formed on the respective core 1541 is finished by a machining process to achieve a desired final finish having a suitable low roughness. The coating 1542 provides the advantage that a highly smooth surface finish can be formed using known grinding and polishing techniques. Typically, the coating 1542 can be finished using a suitable grinding device and abrasive material, such as by diamond grinding or using abrasive powders, to achieve the desired surface roughness. In such embodiments, the final thickness of the coating 1542 is less than its applied thickness. Accordingly, the applied thickness of the coating 1542 is selected to compensate for the coating material that is removed by the finishing process.

EXAMPLE

An example roll is produced by applying a silicate glass composition over a core. The glass composition is as follows: silica, about 40 wt %; soda, about 20 wt %; alumina, about 1.5 wt %; phosphate, about 4 wt %; potash, about 7 wt %; titania, about 12 wt %; vanadium penta-oxide, about 6 wt %; chromia, about 4 wt %; iron oxide, about 3.5 wt %; and Ni, about 2wt %. The core is composed of 6061 T6 aluminum.

The roll is formed by the following process. First, the roll is cleaned by placing in an oven at a temperature of about 1040° F. for about 30 minutes. A glass slurry is wet sprayed onto the roll. The roll is not grit blasted or ground prior to spraying. The roll is then placed in an oven at about 1040° F. for about 1 hour under air to cure the coating. A separate roll is processed using an infrared oven instead of a convection oven, following the same steps as above. The rolls were then subjected to finish grinding.

The coating has an electrical resistivity of about $2\times10^9 \Omega\cdot cm$, a capacitance of about 170 pF, and a time constant of about 0.34 seconds.

The coating has an Ra value of 0.53 $\mu$m and Wt value of 0.74 $\mu$m after grinding. The hardness of the coating is 60 HRC.

As described above, the glass coatings 1542 are advantageous for donor rolls 154 used in various types of scavengeless development systems, including both single and double-component developer material systems.

However, it will be appreciated by those skilled in the art that the coatings 1542 can be also be formed on substrates for various other applications that utilize a coating having controlled electrical properties. That is, the coatings 1542 can be used in various other applications that require a coating that can be electrically charged and discharged. For example, the coatings 1542 can be applied on rolls used in imaging and printing apparatus, including color printing, that would benefit from a coating having controlled electrical properties, as well as certain mechanical, chemical and thermal properties. Such other types of rolls can be included in various types of electrostatographic imaging apparatus, including digital systems.

While the invention has been described in conjunction with the specific embodiments described above, it is evident that many alternatives, modifications and variations are apparent to those skilled in the art. Accordingly, the preferred embodiments of the invention as set forth above are intended to be illustrative and not limiting. Various changes can be made without departing from the spirit and scope of the invention.

What is claimed is:

1. A roll, comprising:
   a core; and
   a coating comprising a silicate glass material provided over the core, wherein the silicate glass material can be electrically charged and discharged, and comprises:
   silica, from about 40 mol % to about 95 mol %;
   soda, from about 5 mol % to about 60 mol %;
   alumina, from 0 to about 7 mol %;
   phosphate, from 0 to about 5 mol %;
   potash, from 0 to about 10 mol %;
   titania, from 0 to about 20 mol %;
   vanadium penta-oxide, from 0 to about 10 mol %;
   chromia, from 0 to about 8 mol %;
   iron oxide, from 0 to about 5 mol %;
   nickel, from 0 to about 5 mol %;
   silver, from 0 to about 5 mol %; and
   gold, from 0 to about 5 mol %.

2. The roll of claim 1, wherein the glass material comprises:
   silica, about 40 wt %;
   soda, about 20 wt %;
   alumina, about 1.5 wt %;
   phosphate, about 4 wt %;
   potash, about 7 wt %;
   titania, about 12 wt %;
   vanadium penta-oxide, about 6 wt %;
   chromia, about 4 wt %;
   iron oxide, about 3.5 wt %; and
   NiO (Nickel Oxide), about 2 wt %.

3. A roll, comprising:
   a core; and
   a coating comprising a silicate glass material provided over the core, wherein the glass silicate material can be electrically charged and discharged, the coating has an arithmetical mean roughness Ra of less than about 1 $\mu$m and a maximum waviness of less than about 1 $\mu$m, and the coating has a hardness of at least about 4 GPa Knoop.

4. A roll, comprising:
   a core; and
   a coating comprising a silicate glass material provided over the core, wherein the glass silicate material can be electrically charged and discharged, the coating has an electrical resistivity of from about $1\times10^4 \Omega\cdot cm$ to about $1\times10^{14} \Omega\cdot cm$, and the coating has a hardness of at least about 4 GPa Knoop.

5. A roll, comprising:
   a core; and
   a coating comprising a silicate glass material provided over the core, wherein the glass silicate material can be electrically charged and discharged, and the coating has a hardness of at least about 4 GPa Knoop.

6. A roll, comprising:
   a core; and
   a coating comprising a silicate glass material provided over the core, wherein the glass silicate material can be electrically charged and discharged, and the core has a first coefficient of thermal expansion and the coating has a second coefficient of thermal expansion that differs from the first coefficient of thermal expansion by less than about 1 ppm/° C.

7. The roll of claim 1, wherein the glass material is chemically resistant to toner and paper fibers.

8. The roll of claim 1, wherein the core comprises a metal.

9. A roll, comprising:
   a core; and
   a coating comprising a silicate glass material provided over the core, wherein the glass silicate material can be electrically charged and discharged, and the core comprises a non-metallic material having a metal coating on which the coating is formed.

10. An electrostatographic imaging apparatus comprising the roll according to claim 1.

11. A charge donor roll, comprising:
    a core; and
    a coating comprising a silicate glass material formed over the core, wherein the coating can be electrically charged and discharged, and the silicate glass material comprises:
    silica, from about 40 mol % to about 95 mol %;
    soda, from about 5 mol % to about 60 mol %;. alumina, from 0 to about 7 mol %;

phosphate, from 0 to about 5 mol %;
potash, from 0 to about 10 mol %;
titania, from 0 to about 20 mol %;
vanadium penta-oxide, from 0 to about 10 mol %;
chromia, from 0 to about 8 mol %;
iron oxide, from 0 to about 5 mol %;
nickel, from 0 to about 5 mol %;
silver, from 0 to about 5 mol %; and
gold, from 0 to about 5 mol %.

12. The charge donor roll of claim 11, wherein the glass material comprises:
silica, about 40 wt %;
soda, about 20 wt %;
alumina, about 1.5 wt %;
phosphate, about 4 wt %;
potash, about 7 wt %;
titania, about 12 wt %;
vanadium penta-oxide, about 6 wt %;
chromia, about 4 wt %;
iron oxide, about 3.5 wt %; and
Ni, about 2 wt %.

13. A charge donor roll, comprising:
a core; and
a coating comprising a silicate glass material formed over the core, wherein the coating can be electrically charged and discharged, the coating has an arithmetical mean roughness Ra of less than about 1 μm and a maximum waviness of less than about 1 μm, and the coating has a hardness of at least about 4 GPa Knoop.

14. A charge donor roll, comprising:
a core; and
a coating comprising a silicate glass material formed over the core, wherein the coating can be electrically charged and discharged, the coating has an electrical resistivity of from about $1\times10^4 \Omega \cdot cm$ to about $1\times10^{14} \Omega \cdot cm$, and the coating has a hardness of at least about 4 GPa Knoop.

15. A charge donor roll, comprising:
a core; and
a coating comprising a silicate glass material formed over the core, wherein the coating can be electrically charged and discharged, and the coating has a hardness of at least about 4 GPa Knoop.

16. A charge donor comprising:
a core; and
a coating comprising a silicate glass material formed over the core, wherein the coating can be electrically charged and discharged, and the core has a first coefficient of thermal expansion and the outer coating has a second coefficient of thermal expansion that differs from the first coefficient of thermal expansion by less than about 1 ppm/° C.

17. The charge donor roll of claim 11, wherein the glass material is chemically resistant to toner and paper fibers.

18. The charge donor roll of claim 11, wherein the core comprises a metal.

19. A charge donor roll comprising;
a core; and
a coating comprising a silicate glass material formed over the core, wherein the coating can be electrically charged and discharged, and the core comprises a non-metallic material having a metal coating on which the coating is formed.

20. An electrostatographic imaging apparatus comprising a charge donor roll according to claim 11.

21. A method of making a roll, comprising providing a coating over a core, the coating comprising a silicate glass material that can be electrically charged and discharged, wherein the silicate glass material comprises:
silica, from about 40 mol % to about 95 mol %;
soda, from about 5 mol % to about 60 mol %;
alumina, from 0 to about 7 mol %;
phosphate, from 0 to about 5 mol %;
potash, from 0 to about 10 mol %;
titania, from 0 to about 20 mol %;
vanadium penta-oxide, from 0 to about 10 mol %;
chromia, from 0 to about 8 mol %;
iron oxide, from 0 to about 5 mol %;
nickel, from 0 to about 5 mol %;
silver, from 0 to about 5 mol %; and
gold, from 0 to about 5 mol %.

22. The method of claim 21, wherein the glass material comprises:
silica, about 40 wt %;
soda, about 20 wt %;
alumina, about 1.5 wt %;
phosphate, about 4 wt %;
potash, about 7 wt %;
titania, about 12 wt %;
vanadium penta-oxide, about 6 wt %;
chromia, about 4 wt %;
iron oxide, about 3.5 wt %; and
Ni, about 2 wt %.

23. A method of making a roll, comprising providing a coating over a core, the coating comprising a silicate glass material that can be electrically charged and discharged, wherein the coating has a hardness of at least about 4 GPa Knoop.

24. The method of claim 21, wherein the core has a first coefficient of thermal expansion and the coating has a second coefficient of thermal expansion that differs from the first coefficient of thermal expansion by less than about 1 ppm/° C.

25. The method of claim 21, wherein the glass material is chemically resistant to toner and paper fibers.

26. The method of claim 21, wherein the coating is applied on the core by electrostatic spraying.

27. The method of claim 21, wherein the coating is applied on the core by wet spraying.

28. The method of claim 21, wherein the core comprises an electrically conductive material on which the outer coating is applied.

29. The method of claim 21, wherein the core comprises a metal outer surface on which the coating is formed.

30. The roll of claim 1, wherein the coating has a thickness between about 0.1 mm to about 0.3 mm.

31. The charge donor roll of claim 11, wherein the coating has a thickness between about 0.1 mm to about 0.3 mm.

32. The method of claim 21, wherein the coating has a thickness between about 0.1 mm to about 0.3 mm.

* * * * *